150 THRASHING
Grain Separators.
A. Straw Carriers.
Walking Rakes.

CLASSIFICATION

DIVISION.

Alvin T. Dunbar and Archibald McNaught.

Combined Threshing Machine & Grain Separator.

Reissued

Mar 16 1869

№ 3332

Witnesses.

Inventors.
Alvin T. Dunbar
Archibald McNaught
By their Attorneys
Wightman & Johnson

UNITED STATES PATENT OFFICE.

ALVIN T. DUNBAR AND ARCHIBALD McNAUGHT, OF ALBA, PA.

IMPROVEMENT IN GRAIN-SEPARATORS AND THRASHING-MACHINES.

Specification forming part of Letters Patent No. 61,816, dated February 5, 1867; Reissue No. 3,332, dated March 16, 1869.

*To all whom it may concern:*

Be it known that we, ALVIN T. DUNBAR and ARCHIBALD McNAUGHT, of Alba, in the county of Bradford and State of Pennsylvania, have invented certain new and useful Improvements in Combined Thrashing-Machines and Grain-Separators; and we do hereby declare that the following is a full, clear, and exact description thereof, which will enable others skilled in the art to make and use the same, reference being had to the accompanying drawings, forming part of this specification, and in which—

Figure 1:
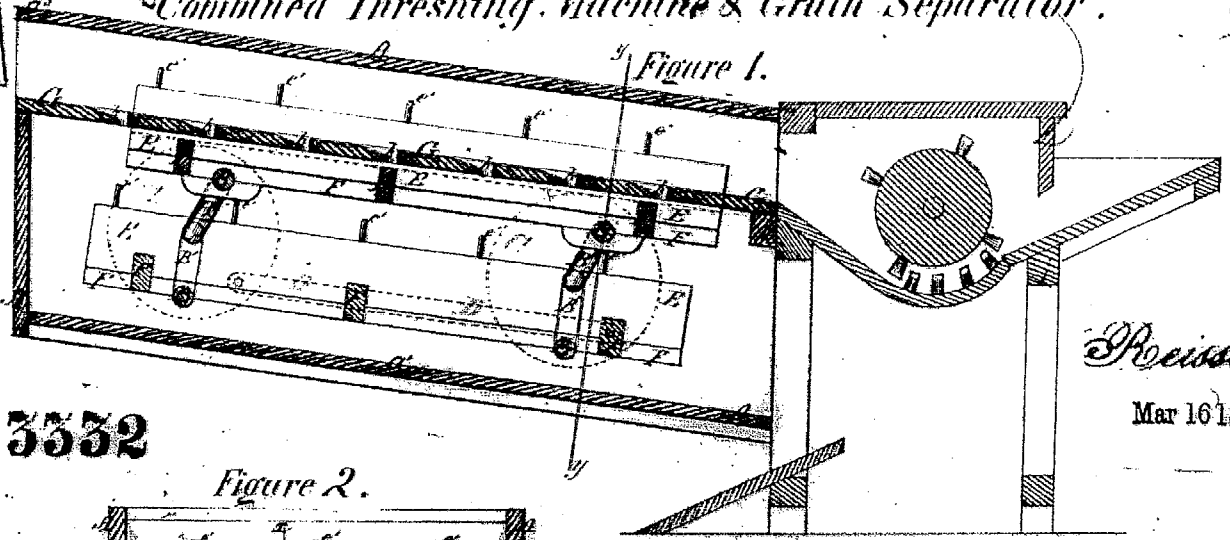
Figure 2:
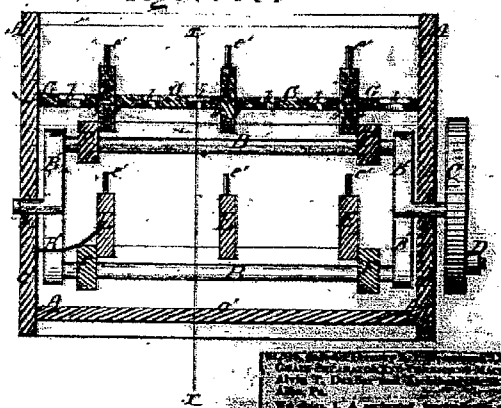
Figure 3:
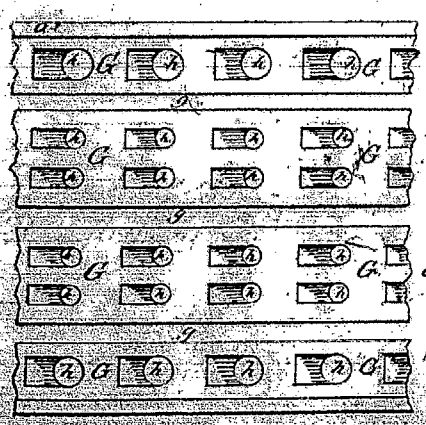

Figure 1 represents a vertical longitudinal section of our improved combined thrasher and grain-separator, taken through the line *x x* of Fig. 2, the black lines representing the highest thrusting position of the beating-bars or shakers, and the red lines the said parts in their lowest position. Fig. 2 represents a vertical cross-section of the same, taken at the line *y y* of Fig. 1, the beaters being shown as occupying the same positions as in Fig. 1. Fig. 3 represents a plan or top view of a portion of the separating-platform, showing the slats which compose the platform, the slots through which the beaters play, and the perforations for the passage of the grain.

We have described that the object of our invention is to furnish an improved apparatus for separating the grain from the straw as they come from the thrashing-machine, and that the separating-machine is driven by the same power that drives the thrashing-machine and cleaning-mill in connection with which it is used, and should be set with its open end toward the cleaning-mill, and at such an inclination as that the grain may pass freely along its bottom to the said mill. For the purpose of illustration, therefore, we have represented in red lines a thrashing-machine situated and combined with the separating apparatus, as described in our patent.

Our invention consists in the employment, in conjunction with a thrashing-machine and a longitudinally-slotted perforated stationary platform, of a series of vertically-reciprocating and longitudinally-moving toothed beating and shaking bars operating through the slots of said platform, upon which the straw is received in such manner as to rise a considerable distance above the platform and descend entirely beneath it for the purpose of giving the straw an intermittent vertical movement by a quick upward thrust and a quick advance motion, thus obtaining two perfect jarring and shaking blows above the platform, so that between the succession of the upward and downward throws of the cranks of said beating-bars the straw will remain at rest and free from movement, which could not be effectually obtained if the beaters did not thus dive down entirely beneath the platform.

Our invention also consists in the employment of a series of vertically-reciprocating and longitudinally-moving beating and shaking bars, in conjunction with a longitudinally-slotted platform arranged and operating in such a manner as to move simultaneously freely through the slots of the platform, lifting the straw entirely therefrom in a body, so as to form a comparatively unobstructed chamber between it and the platform, which facilitates the escape of the grain and tossing or pitching the straw forward in a body, instead of pulling it back and forth by alternately moving bars, as heretofore.

Our invention further consists in the combination and arrangement of a series of simultaneously vertically-reciprocating and longitudinally-moving beating and shaking bars and a longitudinally-slotted perforated stationary platform with a thrashing-machine, as will be hereinafter more fully described.

In the accompanying drawings, A represents the frame or case of the separator of a rectangular form, open at both ends, and having an intermediate stationary platform, G, upon which the separation of the grain from the straw is effected, while the bottom, *a'*, thereof receives and conducts the grain to the cleaning-mill. This separator inclines upward from the thrashing-machine at such an angle as will prevent a too rapid passage of the straw over the platform, and at the same time insures the descent of the separated grain into the cleaning-mill by the inclined bottom *a'*. The space between the top of the separator-case and the slotted platform forms the passage for the straw and grain from the thrashing-machine, and the space between the bottom of said case and the bottom of the slotted platform forms the receptacle of and passage for the grain to the cleaning-mill. The depth of this lower chamber must be such as to admit of the free action of the toothed beating-bars or shakers E in their vertically-reciprocating motion beneath the platform, while the depth of the upper chamber must be sufficient to allow said beaters or shakers to act upon the straw without compressing it against the top of the case.

The receiving and separating platform G is provided longitudinally with a number of slots, *g*, corresponding to the number of toothed beating-bars E which play through them; and the slats or strips G, which constitute the platform, are provided with one or more rows of holes, *h*, of suitable size, and at proper distances apart, for the purpose of allowing the free passage of grain and chaff through the platform, while the straw is moved over it and discharged from its highest end. These perforated slats or strips G should be from four to six inches wide, and should be placed at such distances apart as that the beaters E may move freely through the slots between them.

Beneath the stationary slotted platform G are arranged a series of longitudinal beating-bars or shakers, E, having their upper sides provided with a series of teeth, *e'*, of proper length. In the drawings these teeth are represented as spikes; but they may be of any other suitable form, and of suitable distances apart. These toothed beating-bars are of a length less than that of the slots of the platform to admit of the longitudinally-reciprocating motion of the beaters therein, and are mounted upon two crank-shafts, B, having their bearings in the sides $a^2$ and $a^3$ of the separating-machine, and which are placed one in the forward and the other in the back part of said separator. The cranks and their beaters are so arranged as to produce a reciprocating motion of said beaters in every position in which they are placed, whether rising or falling, parallel to the slotted platform, or nearly so. The bearings of the shafts and the upward stroke of the cranks B' must be such as that each revolution of said cranks will thrust the upper portions of the beating-bars E, with their teeth *e'*, above the slotted platform, so as to strike and lift the straw by the bars from the platform with a sudden sharp blow, thereby lifting it entirely clear of said platform, so as to form a space between the straw thus held up and the platform, which facilitates the escape of the grain, while the downward stroke of the cranks will be such as to bring the toothed beating-bars beneath the platform a distance sufficient to allow them to move through considerable space before again striking the straw, thereby obtaining a thrusting blow, which could not be obtained if the bars and their teeth remained above the surface of the platform. The top sides of the bars rise above the platform a considerable distance, and the entire lifting action of the straw is produced by these bars, while the teeth perform the function of holding the straw and carrying it forward with the longitudinally-reciprocating movement of the beaters. It will thus be seen that at every advance movement of the straw over the platform the body of the straw is raised entirely above it, and is subjected to two severe shocks at each throw of the cranks—the upward thrust from beneath while the straw is at rest throughout the length of the separator, and the sudden throwing of the straw forward in a body against and upon the separator-platform by the sudden advance and descent of the toothed beaters entirely beneath the platform. By this construction and arrangement it will be observed that the action upon the straw is intermittent, and that the platform constitutes a rest for the body of the straw while the cranks are passing through the lowest part of their stroke, thereby causing it to be struck a succession of sharp distinct blows, so as to jar and shake out the grain. This result could not be obtained were the straw not thus left at rest between each blow. To obtain this the cranks are caused to make from one hundred and seventy-five to two hundred revolutions per minute, and each throw of the cranks causes the straw to advance in a body over the platform about the length of a stroke, because the straw being held bodily upon the bars will receive the full effect of their simultaneous forward throw.

The drawings represent the toothed beating-bars as being attached to a frame, F; but we prefer to connect them directly to the crank-shaft B, as being more simple in construction and equally effective. To the ends of the shafts projecting through one of the sides $a^3$ are attached drive-wheels C, which are connected to each other eccentrically by the connecting-rod D by wrist-pins fixed to the outer faces of said wheels or pulleys, so that the said wheels and cranks may revolve together, and thus effect the simultaneous movement of the beaters.

The separator and straw-carrier is driven by the same power that drives the thrashing-machine and cleaning-mill by a band leading from a pulley on the shaft of the thrashing-cylinder, or from a pulley on the fanning-mill shaft to the nearest pulley on the crank-shaft of the separator.

The combined thrasher and separator thus constructed and operated constitutes a simple and efficient mode of carrying away the straw from a thrashing-machine, and effecting a separation of the grain therefrom. It is more simple in construction, more perfect in its operation, is operated with less power than any other machine of equal capacity, and can do an equal amount of work in a given time, at a saving of at least two horses in power, and with far less loss of grain than in any other machine with which we are acquainted.

Having thus described our invention, what we claim is—

1. A perforated longitudinally-slotted grain-platform G, in combination with vertically and longitudinally moving toothed beating and shaking bars E, arranged so as to play between the slats and above and beneath the platform, substantially as described.

2. The combination of simultaneously vertically and longitudinally moving toothed beating and shaking bars E with a longitudinally-slotted platform, G, operating substantially as herein described.

3. The combination of a thrashing-machine, a perforated and longitudinally-slotted stationary platform, G, and toothed beating and shaking bars E, operating substantially as described.

In testimony whereof we have hereunto signed our names.

ALVIN T. DUNBAR.
ARCHIBALD McNAUGHT.

Witnesses:
V. M. WILSON,
C. C. HOOKES.